Oct. 23, 1962     L. PEARMAN     3,059,703
HARVESTING MACHINE
Filed March 5, 1959     7 Sheets-Sheet 1
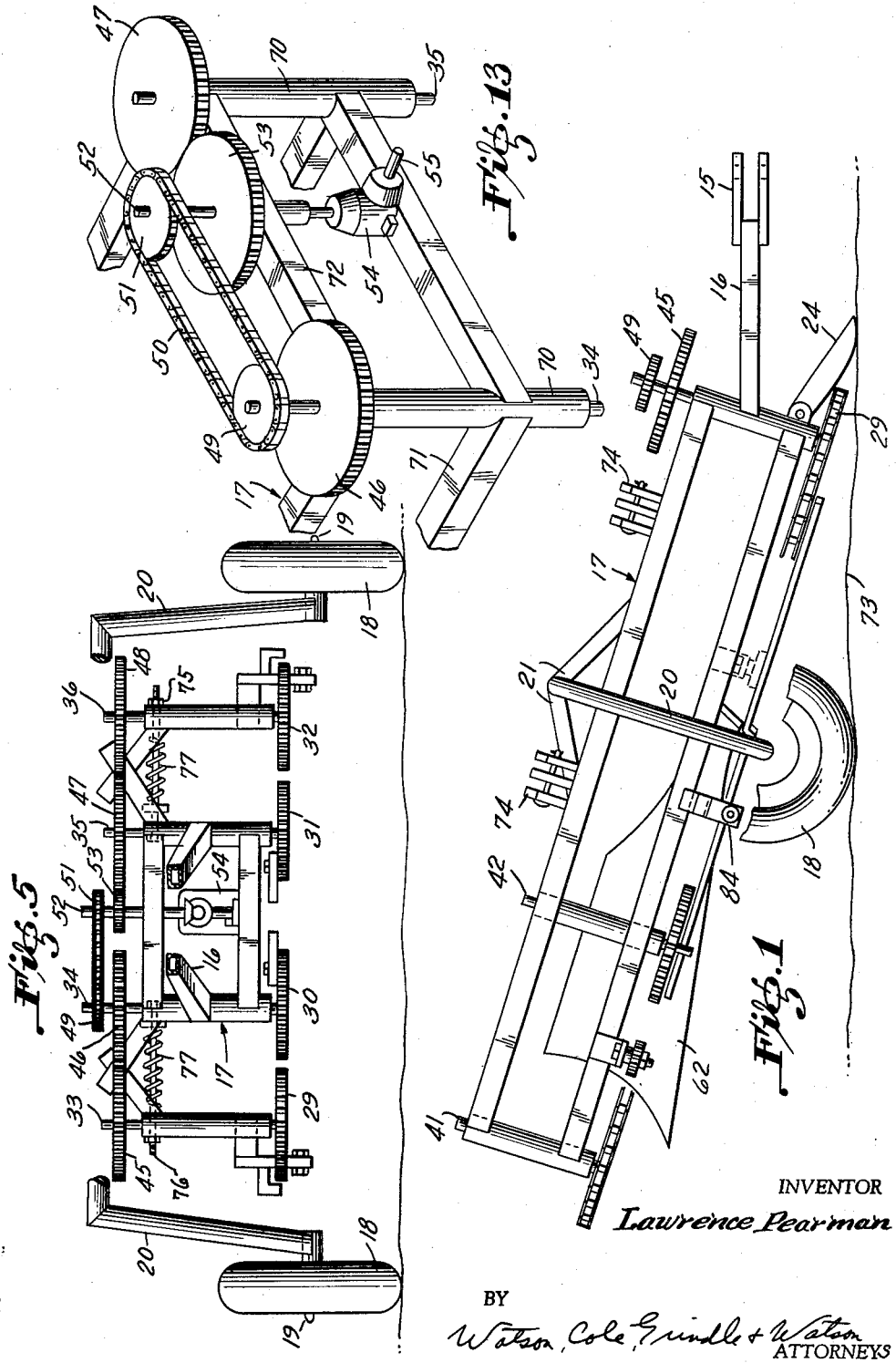
INVENTOR
*Lawrence Pearman*
BY
*Watson, Cole, Grindle & Watson*
ATTORNEYS

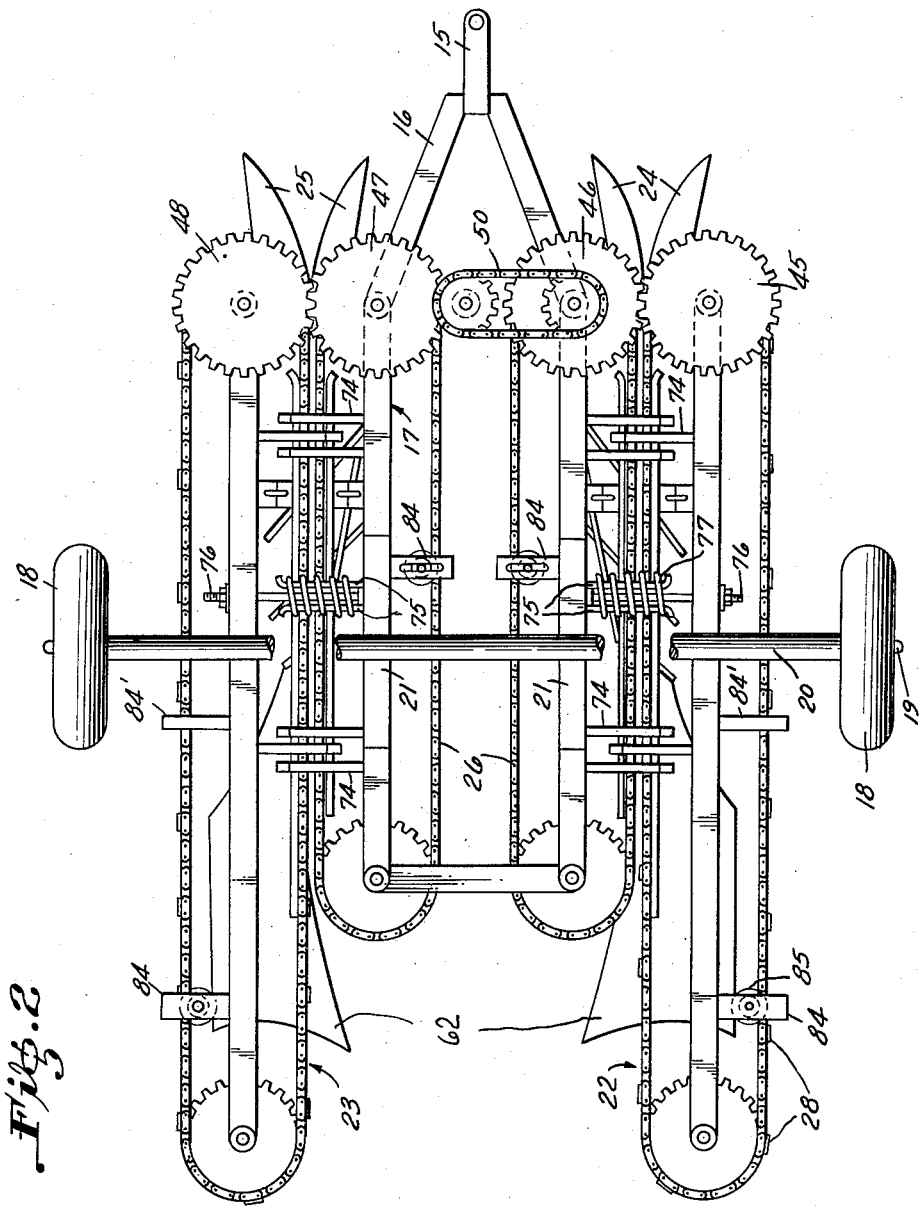

Oct. 23, 1962
L. PEARMAN
3,059,703
HARVESTING MACHINE
Filed March 5, 1959
7 Sheets-Sheet 3
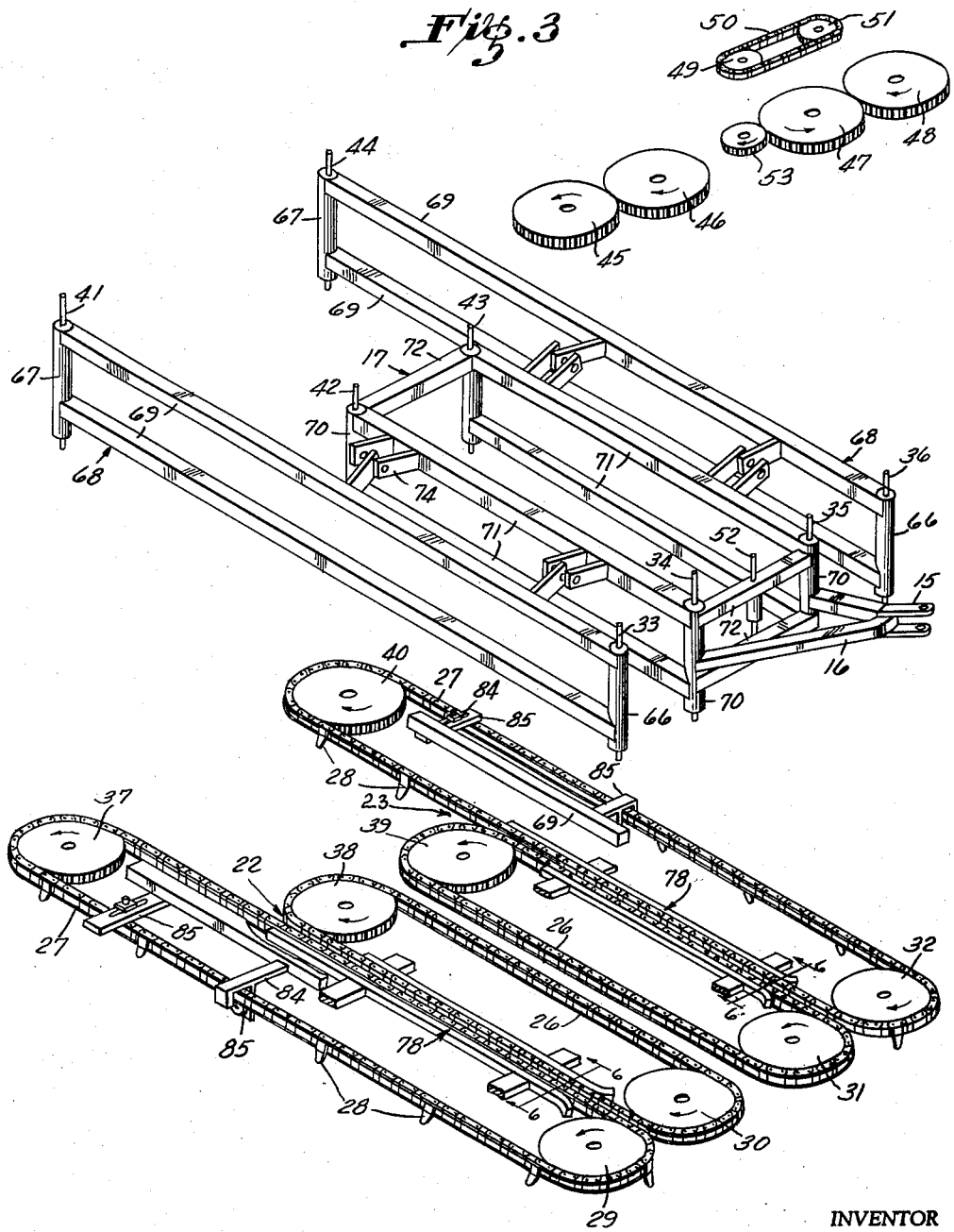
INVENTOR
Lawrence Pearman
BY
Watson, Cole, Grindle & Watson
ATTORNEYS

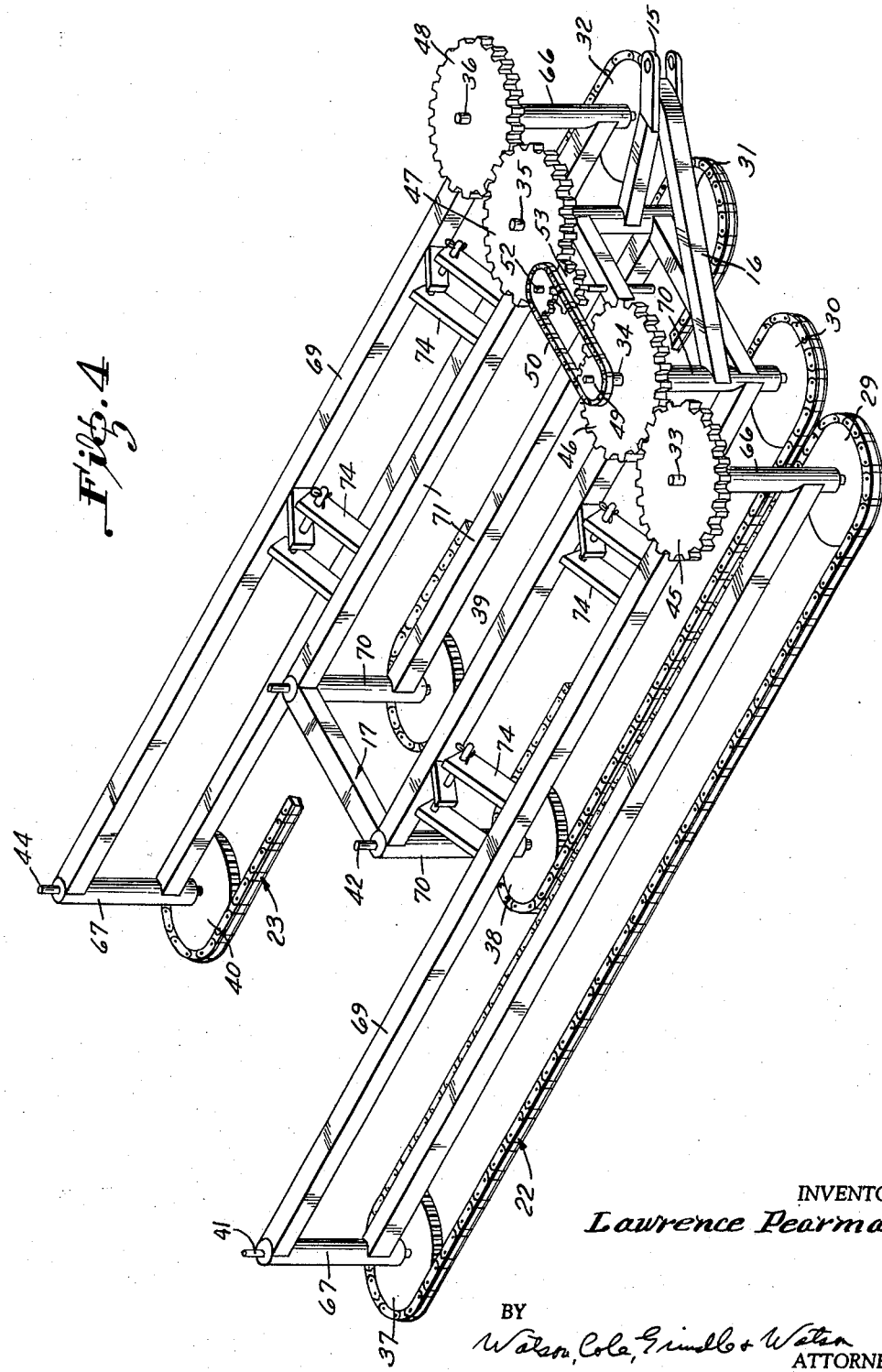

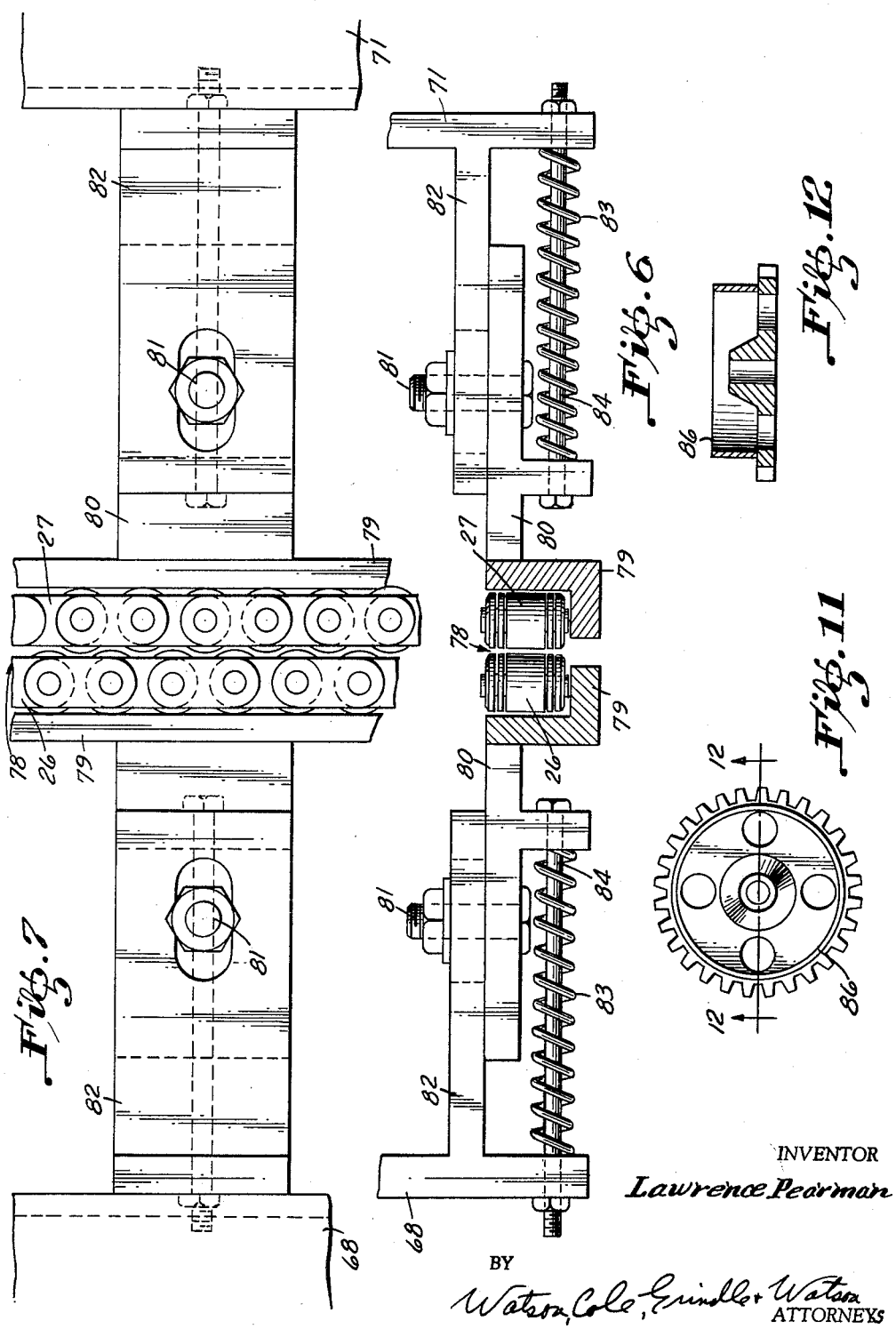

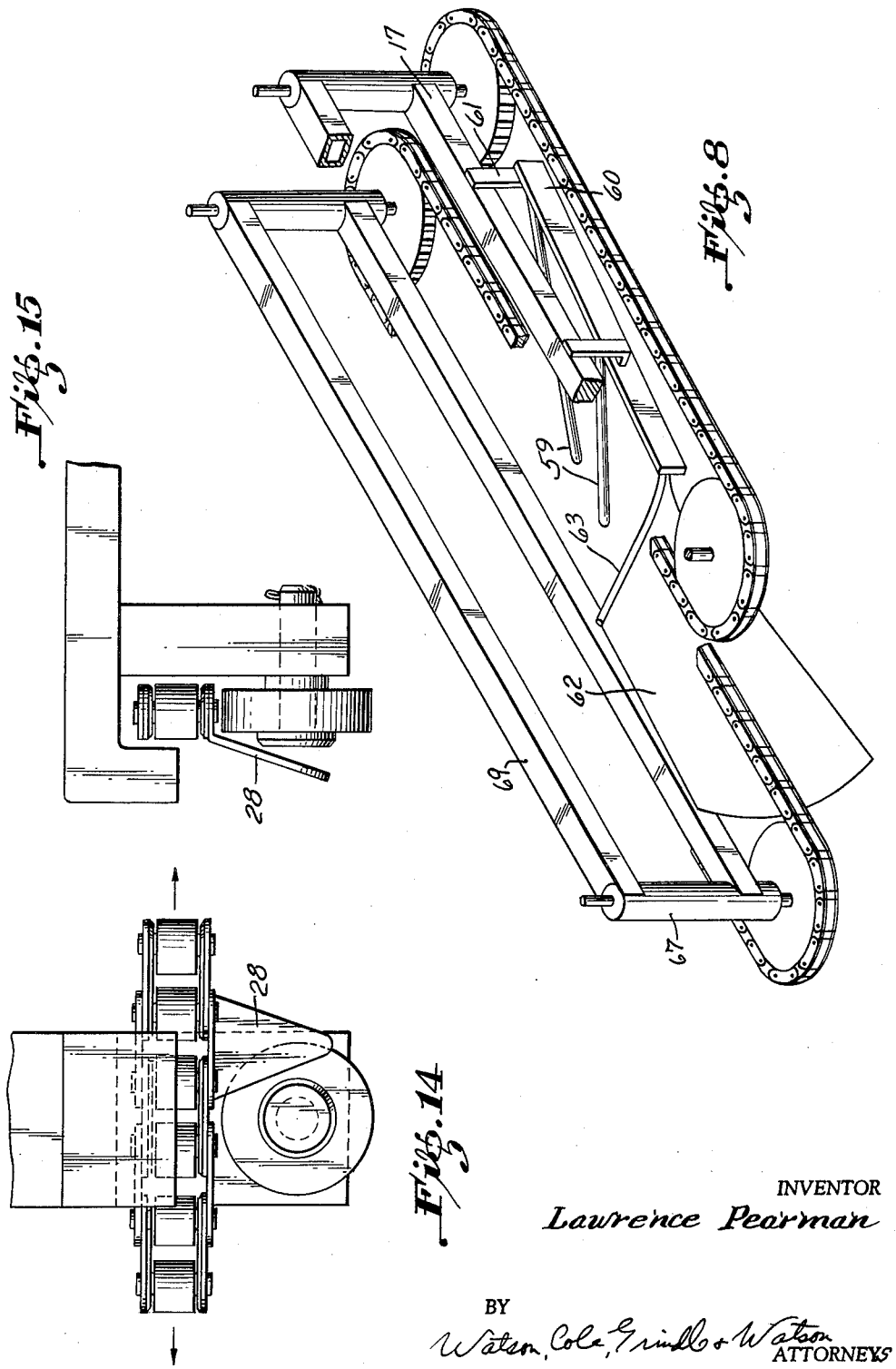

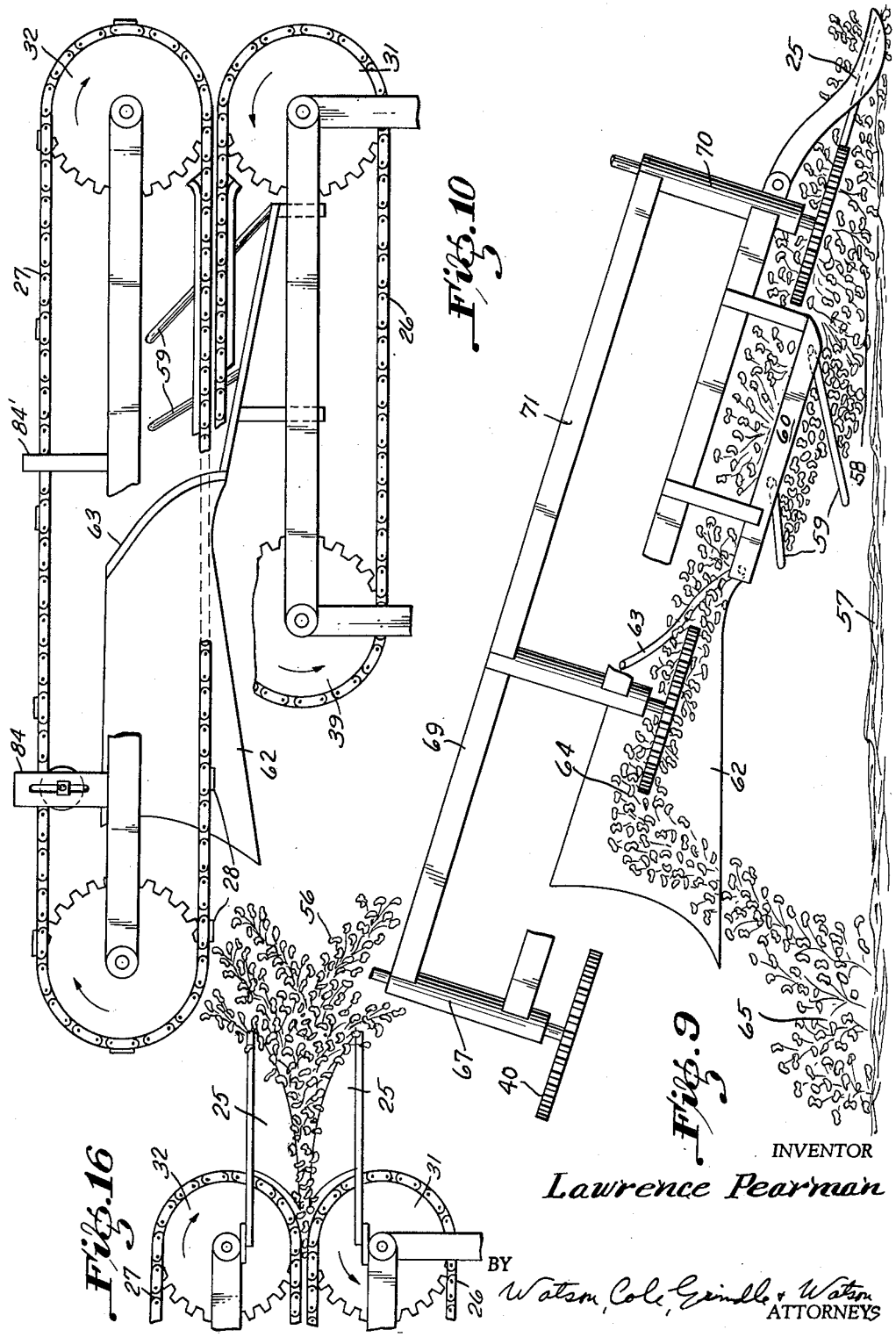

United States Patent Office 3,059,703
Patented Oct. 23, 1962

3,059,703
HARVESTING MACHINE
Lawrence Pearman, Box 42, Chula, Ga.
Filed Mar. 5, 1959, Ser. No. 797,496
3 Claims. (Cl. 171—61)

This invention relates to a method and machine for harvesting peanuts, beets, potatoes, turnips, carrots, onions and other vegetables of a similar nature and flowers, the fruit or bulb of which is below the ground but the vines and stalks are above the ground. For sake of simplicity the machine will be described and reference will be made to harvesting peanuts.

It is an object of this invention to pull peanut plants out of the ground and to knock the dirt from the roots and peanuts and finally to deposit the plants upside down on the ground with all the steps accomplished while the machine is moving along the field following rows of plants of which the fruit or nuts is to be harvested. It is a further object of the invention to provide a machine which will extract or pull the peanuts slowly out of the ground, that is, more if not all of the nuts will be attached to the vines to be laid on the ground with the nuts on top. One advantage in leaving the peanuts on the ground bottom side upwards insofar as the vines are concerned, is that it allows the peanuts to cure more readily by the sun and prevents the stems from rotting during rainy weather, which causes the nuts to shed or fall off before they are processed.

Another object of the invention is to provide a machine which may be connected to a power vehicle such as a tractor which latter also supplies power to run the harvesting machine. A still further object of the invention is to provide a machine with one or more pairs of harvesting chains each having an endless run with part of the latter in adjacent cooperation and of which one endless chain of a pair is longer than the adjacent chain. A further object of the invention resides in the provision of a turn wing cooperating with the chains and also bars to shake the dirt from the roots and peanuts.

In summary the machine of this invention serves the purpose of extracting plants, such as peanut plants from the ground, removing most if not all of the dirt from the peanuts and finally turning the plants upside down and placing the plants back on the ground with the vine on the bottom and the peanuts on top.

Further objects will be apparent from the following description when considered in connection with the accompanying drawings wherein like reference characters denote the same or similar parts in the several views and in which:

FIGURE 1 is a side view of the harvesting machine showing the angle of the machine relative to the ground.

FIGURE 2 is a top plan view of the machine,

FIGURE 3 is an exploded view of the machine,

FIGURE 4 is a perspective view of the machine,

FIGURE 5 is a front end view of the machine with certain parts omitted,

FIGURE 6 is an enlarged cross section taken on line 6—6 of FIG. 3 in the direction of the arrows, FIGURE 7 is an enlarged top plan view of the detail of FIG. 6, FIGURE 8 is an enlarged perspective view of one set of cooperating chains with supports and the bars and turn wing, FIGURE 9 is a side view of the detail of FIG. 8, FIGURE 10 is a top plan view of one set of chains, FIGURE 11 is an enlarged plan view of one of the sprocket wheels, FIGURE 12 is a cross section of the sprocket wheel taken on line 12—12 of FIG. 11, FIGURE 13 is an enlarged perspective view of the drive for the chains, FIGURE 14 is a side view of a detail of one of the chains, FIGURE 15 is an end view of the detail of FIG. 14, and FIGURE 16 is a plan view of the front end of the machine.

The plant extracting machine may have its own motive power or motor to advance the machine over the ground and to actuate the various moving parts, but as is preferable and as shown, the machine may be pulled along on the ground by a tractor or truck, not shown, connected to a hitching link 15 connected in turn to a draft fork 16. The fork 16 is connected to a center frame 17, as best shown in FIGS. 1 to 5. The frame 17 is supported on a pair of wheels 18 rotatably mounted on axles 19, which latter are connected to a U-shaped bar 20 connected to the frame 17 by means of stay members 21, FIGS. 1 and 2.

As shown in FIG. 1, 73 indicates the approximate ground level with the hitching link 15 and fork 16 substantially parallel with the ground plane 73 and thus showing the angular position of the frame 17 and as a matter of fact, the small angle which the machine makes relative to the ground level.

The machine is provided with means to pull the plants out of the ground, to remove the dirt from the roots and peanuts and finally to release the plants upside down back on the ground. The advantage in leaving the peanuts on the ground bottom side upwards as to the plants, is that it allows the peanuts to cure more readily from the action of the sun and further prevents the stems from rotting during rainy weather which causes the nuts to shed off before they are processed. The means to pull the plants and to remove the dirt therefrom and to deposit them on the ground, is accomplished according to the invention by a pair of cooperating chain members of which there are preferably two pair on the machine, as shown in FIGS. 2 and 3. The chain pairs 22 and 23 are each provided with a pair of guide plates 24 and 25 to guide the plants into the cooperating chains. The chains of each pair comprises one endless chain 26 which is shorter than its cooperating or outer chain 27. The chains 27 are provided with downwardly extending fingers 28, FIGS. 14 and 15, mounted in spaced relation relative to each other.

The two pairs of chains 26 and 27 are driven by means of sprocket wheels 29, 30, 31 and 32, FIGS. 3 and 4, mounted on and rotating with shafts 33, 34, 35 and 36 respectively. There are rear sprocket wheels 37, 38, 39 and 40 mounted on shafts 41, 42, 43 and 44 respectively. The drive for all the chains and sprocket wheels are driven by gears 45, 46, 47 and 48 mounted to rotate with the shafts 33, 34, 35 and 36 respectively. The shaft 34 is driven by a small gear 49 driven by a chain 50 from gear 51. Gear 51 is driven by a shaft 52 having a second gear 53 thereon which latter meshes with the gear 47. A gear box 54, FIGS. 5 and 13, drives the shaft 52 and the drive from the gear box 54 is operatively connected by a shaft 55 to a power tractor, not shown, which hauls the harvester.

FIGS. 9 and 16 illustrate the method of harvesting, for example, peanuts and FIG. 16 shows a row of peanut plants 56 being guided into the harvester by means of the pair of guide plates 25. The plates 25 guide the peanut plants between the pair of chains 26 and 27 and as the machine moves along the ground 57, FIG. 9, the plants are elevated at 58 with the peanuts being pulled out of the ground. The plants and particularly the peanuts strike a plurality of rods 59 which tend to knock the dirt from the roots and peanuts. These rods 59 are mounted and secured to a flat depending bar 60 secured by supports 61 from the frame 17 and a turn wing 62 is also connected to the bar 60 by means of a rod 63. The wing 62 is so shaped that the plants at 64 are turned approximately 180° by sliding contact so that the plants when released by the chains 26 and 27 will be deposited at 65 on the ground surface 57 supported thereon by the vine structure of the plants and the peanuts approximately uppermost.

The various sprocket wheels and chains are supported on shafts and a frame work as shown in FIG. 3 in which upright tubular members 66 and 67 form part of the outside frames 68 together with longitudinal bars 69. The tubular members 66 form bearings for the front shafts 33 and 36 and the tubular members 67 form bearings for the rear shafts 41 and 44. The intermediate frame 17 is provided with four tubular members 70 which support and form bearings for the shafts 34, 35, 42 and 43 and are interconnected by longitudinal frame bars 71 and lateral frame bars 72. As shown the fork 16 is secured to the vertical tubular members 70 at the front end of the harvester. The frame 17 is connected to and is supported from the bar 20, FIG. 2, by means of the stay members or bars 21. Hinge members 74, FIG. 3 are connected to the frame bars 71 and to the upper bars 69.

As shown in FIGS. 2 and 5 a pair of stay bolts 75 are connected to a bolt 76 through a tension spring 77 so that the outer chain units 22 and 23 will be urged and pulled toward the inner chain units 26 so that the runs of the chains which cooperate with each other will be as close as possible.

As shown in FIGS. 3, 6 and 7 the chains 26 and 27 at each approximate meeting run as indicated at 78 are supported by right angle members 79 connected to lateral supporting bars 80 provided with an adjustable bolt 81 and connected to the frame 68 and 71. The bolt 81 actually interconnects two relatively movable bars 80 and 82 and a compression spring 83 on a bolt 84 urges the members 80 and 79 toward each other. In this way the chains will be urged toward each other.

The outer run of the chains 27 is also supported by roller supports 84 secured to the frame 69 and connected by extending arms 85. These supports 84 are idle roller elements and are provided in spaced relationship.

Each sprocket wheel 29, 30, 31 and 32 is preferably provided with a circular shield 86 as shown in FIGS. 11 and 12 to prevent the plants from becoming enmeshed between the chains and the sprocket wheels.

The harvester operates as follows:

The machine is preferably pulled or towed by a tractor, not shown, which latter also supplies the motive power to actuate the harvesting members. This power supply is provided preferably through the shaft 55, through the gear box 54 to the pairs of chains 22, 23 and 26 by means of the gear wheels 45, 46, 47, 48, 49, 50 and 51. The sprocket wheels 29, 30, 31 and 32 thus actuate the chains and as the pivoted guide plates 24 and 25 guide and scoop up the plants and due to the position of the harvester relative to the ground level 73, FIGS. 1 and 8, the chains take hold of the plants and pull them out of the ground as indicated at 58 in FIG. 9. Then the plants and particularly the peanuts with the dirt adhering thereto strike the rods 59, the latter knocks the dirt from the roots and peanuts until the plants strike the turn wing 62 where the plants are reversed as they are released from the chains and the plants are then deposited on the ground at 65 on the surface 57 with the vine structure of the plants being at the bottom and the peanuts uppermost. Thus in simple terms the machine extracts the peanut plants out of the ground, deletes or removes the dirt from the peanuts and turns the plants over and places them back on the ground with the peanuts uppermost and on top. One of the advantages of this machine is that it extracts the peanuts more slowly than heretofore leaving more of the peanuts attached to the vines and then lays them down bottom side upwards relative to the plants. This results in the advantage of permitting the peanuts to cure more readily from the sun and presents the stems from rotting during rainy weather which causes the nuts to shed before they are processed.

As described and as shown in FIG. 10 for example, the chain 26 as to its length between its end sprocket wheels 31 and 39 is shorter than its cooperating chain 27 as to its length between its end sprocket wheels 32 and 40, FIG. 3. This is for the purpose of ensuring the turning and release of the plants as they have been engaged by the fingers 28 from which they are released adjacent the wing 62. In other words the added length of the outer chain 27 provides for the release from the fingers 28 and the turning action which takes place by the wing 62.

As to the shield 86 on each sprocket wheel as shown in FIGS. 11 and 12 also and particularly prevents the vines and plants from wrapping around the shafts 66 and 67.

The purpose of permitting the outer frames 68 formed by the longitudinal bars 69, to swing out by means of the hinge members 74 is to permit thicker plants to be accommodated and also if foreign objects are encountered the machine parts will not be damaged. Thus the distance between cooperating chains are adjustable.

The machine is applicable for use with any other type of plant as well as vegetables and also flower plants, which have bulb structures below ground. Thus the machine may be adapted to any plant where the seed, fruit or bulb grows below or under the ground surface.

The present invention is not to be confined to any strict conformity with the showings in the drawings, and changes or modifications may be made therein insofar as such changes or modifications mark no material departure from the salient features of the invention as set forth and defined in the appended claims.

I claim as my invention:

1. A machine for pulling peanut plants out of the ground and depositing the same back on the surface thereof, comprising a pair of uniplanar endless chains having their adjacent flights in coacting relationship to grip the peanut plants, and a turning wing located directly below the discharge end portion of said endless chains and having a discharge edge portion adjacent and substantially parallel to the said adjacent flights of said chains, whereby when the peanut plants are discharged from said chains they will fall onto the ground in inverted position.

2. A machine for pulling peanut plants out of the ground according to claim 1, in which a depending bar and a plurality of bars mounted thereon are provided in the path of the moving plants to knock dirt from the peanuts as the plants are conveyed by the chains.

3. A machine for pulling peanut plants out of the ground according to claim 1, in which a plurality of fingers are mounted on one of the chains in spaced relation and depending from the chain to guide the plants from turning wing for the inverting operation.

References Cited in the file of this patent

UNITED STATES PATENTS

| | | |
|---|---|---|
| 1,509,799 | Vessot et al. | Sept. 23, 1924 |
| 1,935,199 | Albrecht | Nov. 14, 1933 |
| 2,368,895 | Spiegl | Feb. 6, 1945 |
| 2,525,018 | Corwin | Oct. 10, 1950 |
| 2,540,094 | Brown et al. | Feb. 6, 1951 |
| 2,581,661 | Hume | Jan. 8, 1952 |
| 2,771,728 | Mason | Nov. 27, 1956 |
| 2,907,393 | Hawkins | Oct. 6, 1959 |